UNITED STATES PATENT OFFICE.

ARNALDO PIUTTI, OF NAPLES, ITALY, ASSIGNOR TO THE FARBWERKE, VORMALS MEISTER, LUCIUS & BRÜNING, OF HÖCHST-ON-THE-MAIN, GERMANY.

PARAETHOXYPHENYLSUCCINAMIC ACID AND METHOD OF MAKING SAME.

SPECIFICATION forming part of Letters Patent No. 569,425, dated October 13, 1896.

Application filed November 2, 1895. Serial No. 567,734. (Specimens.)

*To all whom it may concern:*

Be it known that I, ARNALDO PIUTTI, a citizen of the Kingdom of Italy, residing at Naples, in the Kingdom of Italy, have invented certain new and useful Improvements in the Manufacture of Paraethoxyphenylsuccinamic Acid, of which the following is a specification.

My invention relates to the manufacture of paraethoxyphenylsuccinamic acid, which is carried out as described in the following example: 1.2 kilograms of succinic acid are powdered and heated with 1.4 kilograms of paraphenetidin in an oil bath to a temperature of from 110° to 140° centigrade until the formation of water has ceased. The almost-colorless product of the reaction, namely, paraethoxyphenylsuccinimide, which was unknown up to the present time, is powdered and heated with a diluted caustic-soda solution containing 0.4 kilograms of caustic soda. A solution results which contains the sodium salt of paraethoxyphenylsuccinamic acid, from which paraethoxyphenylsuccinamic acid is precipitated by hydrochloric acid or other mineral acid.

Paraethoxyphenylsuccinamic acid is intended for medicinal purposes and has the constitutional formula:

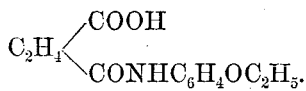

It is easily soluble in alcohol or acetic acid, little soluble in cold water, soluble in warm water. It crystallizes in lustrous colorless plates, it melts at from 160° to 161°, is easily soluble in caustic soda and soda solution. The sodium salt is very easily soluble in water and is obtained as a white powder on evaporating a solution of it.

The new substance is used as a specific for fever and is given in doses from 0.5 to one gram.

Having thus described my invention, I claim as new and desire to secure by Letters Patent—

1. The process herein described of producing paraethoxyphenylsuccinamic acid which consists in heating succinic acid with paraphenetidin until the formation of water ceases, then dissolving the product of the reaction in caustic soda, and precipitating the paraethoxyphenylsuccinamic acid by a mineral acid, substantially as set forth.

2. As a new article, paraethoxyphenylsuccinamic acid, having the constitutional formula

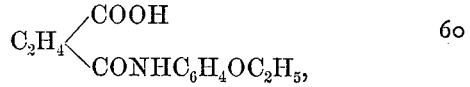

being easily soluble in alcohol and acetic acid, difficultly soluble in water, crystallizing in lustrous colorless plates, melting at from 160° to 161°; its sodium salt being easily soluble in water and obtained as a white powder on evaporating its solutions, substantially as set forth.

In testimony that I claim the foregoing as my invention I have signed my name in presence of two subscribing witnesses.

ARNALDO PIUTTI.

Witnesses:
 EMILIO MONTI,
 PESCHACHER.